(12) United States Patent
Bichigov et al.

(10) Patent No.: US 8,271,511 B2
(45) Date of Patent: Sep. 18, 2012

(54) METHOD FOR FORMING A REFERENCE LIST OF MARKS, DATABASE AND METHOD FOR FORMING SAID DATABASE

(76) Inventors: Vladimir Nickolaevich Bichigov, Miass (RU); Pavel Anatolievich Zaytsev, Miass (RU); Alexandr Vladimirovich Moksin, Miass (RU); Ivan Borisovich Shapshal, Miass (RU)

( * ) Notice: Subject to any disclaimer, the term of this patent is extended or adjusted under 35 U.S.C. 154(b) by 0 days.

(21) Appl. No.: 12/663,857

(22) PCT Filed: Oct. 12, 2009

(86) PCT No.: PCT/RU2009/000532
§ 371 (c)(1),
(2), (4) Date: Dec. 10, 2009

(87) PCT Pub. No.: WO2010/050846
PCT Pub. Date: May 6, 2010

(65) Prior Publication Data
US 2011/0246522 A1  Oct. 6, 2011

(30) Foreign Application Priority Data

Oct. 29, 2008  (EA) .................................. 200802073

(51) Int. Cl.
*G06F 17/30* (2006.01)
(52) U.S. Cl. ...................................................... 707/758
(58) Field of Classification Search .................. 707/706, 707/707, 711, 722, 741, 758, 769, 801, 802; 382/128, 181
See application file for complete search history.

(56) References Cited

U.S. PATENT DOCUMENTS

| 7,266,224 | B2 | 9/2007 | Sukegawa |
| 7,324,670 | B2 | 1/2008 | Kozakaya et al. |
| 2004/0062426 | A1 | 4/2004 | Lo |
| 2006/0153433 | A1 | 7/2006 | Lo |

*Primary Examiner* — Cam-Linh Nguyen

(57) ABSTRACT

The present invention relates to a method for forming a mark reference list using a database including a register of mark-forming objects in the form of a sample array, and a mark array. According to this method, a mark is compared with each sample of the sample array, match indexes of the mark and said each sample are determined based on said comparison, and a list of high match indexes of the mark and the samples is formed. The decision that a mark should be included into the reference list is made, if the match index of a query sample and the mark is higher than the lowest index of the list of high match indexes of the mark and the samples.

16 Claims, No Drawings

METHOD FOR FORMING A REFERENCE LIST OF MARKS, DATABASE AND METHOD FOR FORMING SAID DATABASE

CROSS-REFERENCE TO RELATED APPLICATIONS

This application claims the benefits from International Application PCT/RU2009/000532 filed on Oct. 12, 2009 and priority application EA200802073 filed on Oct. 29, 2008. The contents of these applications are hereby incorporated by reference and in their entirety.

FIELD OF THE INVENTION

The present invention relates to methods for researching marks, in particular to methods for forming reference lists of marks using a database including an array of marks and an array of samples. The invention further relates to databases of this type and methods for forming these databases. The invention can be most effectively utilized in automated information retrieval systems.

BACKGROUND ART

Various identification systems are widely used in police and judicial practice to solve the problem of matching a sample image obtained under the prescribed procedure and a mark image obtained accidentally.

Typically, a mark-forming body is a person, and therefore, a mark can be a finger mark or a video frame obtained from a security camera and displaying an image of a person. In this case, in order to identify the object, the mark is compared with samples which are a fingerprint, a photograph, or a video frame displaying an image of a person.

Databases used by information retrieval systems usually include an array of samples and an array of marks, and can contain millions of samples and thousands of unidentified marks. Therefore, in research automated information retrieval systems, e.g. automated dactyloscopic information retrieval systems are used.

In comparative studies, information retrieval systems usually compare samples obtained under the prescribed procedure with marks obtained accidentally.

For example, in dactyloscopic research, personal identification systems usually compare fingerprint and/or palmprint and/or footprint images obtained under the prescribed procedure with finger and/or palm and/or foot marks left on various surfaces and obtained accidentally. As applied herein, a fingerprint and/or palmprint and/or footprint, here constituting a sample, is a dactyloscopic image of skin pattern of a finger, palm or foot obtained by impressing or rolling corresponding skin region against a paper surface or dactyloscopic scanner under the condition that the prescribed dactyloscopic procedure is followed. As applied herein, a dactyloscopic card is a personal profile including a set of prints and personal information.

As applied herein, a mark is a dactyloscopic image usually obtained on a scene of the crime and left by an unidentified person by touching a surface with a finger, palm or foot.

As applied herein, a mark card is a card comprising images of all scene of crime marks.

An automated dactyloscopic information retrieval system compares a query dactyloscopic object (i.e. an object to be compared) with the data in the database. Four types of search are usually performed, namely a query print is compared with prints in the array of prints, a query print is compared with marks in the array of marks, a query mark is compared with prints in the array of prints, and a query mark is compared with marks in the array of mark.

As a result of the search, a reference list of objects that may belong to the same person as the query object is formed, the list being intended for further comparison by an expert. With large databases, to ensure sufficient reliability of the search, the list may be expanded, thus increasing the amount of manual labor by operators reviewing the search results. As applied herein, the search reliability is the probability of including into the reference list a predefined number (usually as a percent of the total objects in the database) of the dactyloscopic objects relevant to the query object, i.e. left by the same person. The search reliability should normally be at least 90%

The comparison of a new print with prints in the array of prints in the database is somewhat an ordinary task because the print is usually obtained in stationary conditions using an approved technique ensuring relatively good image quality. Therefore, when comparing prints, the number of candidate records in reference lists is relatively small. That is, two prints belonging to the same person shall be identified with high accuracy.

At the same time, when a print is compared to a mark, or a mark is compared to a print, extensive reference lists have to be formed requiring much labor to ensure sufficient reliability.

In US patent application 2006/0153433 a method for comparing prints is disclosed, the method being used in print matching apparatus for identifying a user. A query print of a user is compared with the print of the same user previously enrolled in the apparatus database, and a match index is determined. If the match index exceeds a verification threshold, the apparatus considers the query print matching with the enrolled print, thus verifying the identity of the user.

According to this method, each print, when enrolled in the apparatus database, is compared to prints in the set of reference prints. Results of this comparison, particularly, the highest match index and the individual verification threshold are stored with each print in the database for further comparisons.

In US 2006/0153433, a "one-to-one" matching is described, and no possibility for searching for the query print in the prints database is disclosed. However, this method, if used in print-to-print and print-to-mark searches, would result in smaller reference lists because of individual verification thresholds used. Nevertheless, to determine an individual verification threshold statistical calculations are used, thus the results are approximate. Consequently, the search results are not error-free, so that irrelevant candidate records may occur in the reference list. Therefore, using this method for a print-to-mark search will not provide required search accuracy.

In US patent application 2004/0062426 an automated fingerprint system and method is disclosed. A query object is compared with each object of the database. Further to the comparison, a match index of the query object (e.g. a fingerprint) and each object of the database is determined, and a reference list associated with this query object is formed by including objects whose match indexes are higher than the predetermined threshold index. Then the reference list is forwarded to the examiner for making visual comparison between the images of the found objects and the query object.

According to the method described above, the comparison can be performed in several levels, each using its own algorithm. In the first level, objects whose pattern features correspond to those of the query object are selected from the database. Then an additional selection can be made by analyzing the strength of match of the selected objects (having the same pattern features as those of the query object) with the query object. The number of objects in the reference list limited in this way will ensure required reliability.

It is important that objects to be compared shall have approximately similar statistical properties. However, this is not necessarily the case even for prints.

It shall be noted that print-to-mark comparison is much more difficult task because, in contrast to prints, marks left in various situations and on various surfaces are processed using various means with different thoroughness. Furthermore, marks vary in area and can be left by different parts of one or more fingers or palm, thus containing a different number of dactyloscopic features. Therefore, when comparing a print with marks in the array of marks, it is difficult to determine which of the marks should be included in the reference list for a given print: sample A with a low match index, or sample B with a high match index. Due to differences in statistical properties of the objects, it is difficult to determine a minimal match index indicating high probability that the mark matches the print, so that this mark shall be included in the reference list for further comparison. Therefore, using only the first level of the described method, it is necessary to form reference lists including a high number of marks to achieve required reliability. To form reference lists with an acceptable number of marks, developers use to voluntary limit this number. However, this obviously leads to lower reliability.

In order to increase the comparison accuracy with the understanding that the desired search reliability is maintained, said method provides the second and third levels in which match probability is determined by further analyzing the reference list obtained in the first level. When evaluating the probability that a query print and a print in the database match, the data obtained by comparison of other prints from the compared print sets can be used. Obviously, these stages in which match probability is determined, when used for a print-to-print search, allow shorter reference list forwarded to an operator for visual examination.

In US 2004/0062426 said second and third levels are used only in print-to-print search. In the case of print-to-mark search, a dactyloscopic card can be compared with a mark card containing scene of crime marks. However, in contrast to the dactyloscopic card, marks in the mark card belong to a single person only with a certain degree of probability because actual scene of crime marks can be left by different people. Therefore, the probability that the query print matches the mark under examination is only slightly influenced by the results of comparison between the remaining prints from the query dactyloscopic card and the remaining marks from the mark card. Thus, using the algorithms of said second and third levels for print-to-mark search will not lead to substantial shortening of the reference list with the understanding that the desired search reliability is maintained.

Also known in the art are systems for comparing an image (e.g. obtained by a camera) of a person's face or its region with corresponding images of identified persons obtained in advance. However, known systems have a number of disadvantages and cannot be used for comparing marks and samples of various nature with sufficient accuracy.

In U.S. Pat. No. 7,324,670 a face image processing apparatus is disclosed. The apparatus compares a region of a human face in an image obtained by a camera with a corresponding region of a face of an identified person previously registered with the apparatus. Using known methods of image recognition, the apparatus determines the similarity measure between the regions. However, this apparatus compares face region images obtained in approximately the same conditions, and cannot provide sufficiently accurate comparison of face images obtained accidentally and in various conditions.

In U.S. Pat. No. 7,266,224 a person recognition apparatus used for personal identification is disclosed. The apparatus compares an image obtained from a camera and biometric data previously stored in the apparatus memory. On receiving the data from a camera, the apparatus compares the data obtained by image processing with the stored data of all previously registered persons, and selects the person most similar to the person shot by the camera. Then the apparatus calculates a similarity of the previously registered person and the person to be identified. If this data match level is higher than the predetermined threshold, the person is regarded as identified, and vice versa.

It should be noted that this threshold is obtained by calculation, that may lead to additional error during the identification.

In the apparatus, the biometric information stored in the memory can be updated, thus reducing the probability of misidentification caused by age-related changes of the person to be identified, or the difference in face size of the person to be identified during advance registration and further identification. To judge whether the biometric information should be updated an updating range is set.

However, such approach allows the reduction of the error probability only when the images of a person to be identified are obtained in similar conditions. When comparing images obtained accidentally, the device cannot provide sufficient identification accuracy.

BRIEF SUMMARY OF THE INVENTION

It is the object of the present invention to overcome disadvantages of the prior art, such as insufficient accuracy when searching in a marks database a mark corresponding to a sample as compared to the accuracy when searching in a sample database a sample corresponding to a query sample.

The object is achieved by a method for forming a reference list of marks using a database including an array of marks and an array of samples, the method providing the reduction of labor in the image analysis due to the shortening of this reference list with the understanding that the desired search reliability is maintained.

The object is also achieved by providing a method for forming a database which can form such reference list, and a database used for forming said reference list.

To form a reference list of marks using a database including a register of mark-forming objects comprising an array of samples, and an array of marks, a query sample is compared with a mark in the array of marks. As a result of this comparison, an index of mach between the query sample and the mark is determined. According to the present invention, the mark is compared to each sample in the array of samples, indexes of mach between the mark and each sample are determined, and a list of high match indexes is formed.

According to the claimed method, the decision that a mark should be included into the reference list is made if the index of mach between a query sample and the mark is higher than the lowest of said high match indexes in the list of high match indexes.

The mark-forming object can be a person. If this is the case, the mark can be a finger mark or a video frame from a security camera, and the sample can be a fingerprint, or a photograph/video frame, respectively.

Furthermore, the mark-forming object can be a firearm. In this case, the mark can be a firearm bore mark on a bullet taken from a scene of the crime, and the sample can be a firearm bore mark from a bullet shot in laboratory conditions.

The mark-forming object can also be footwear, then the mark can be a footwear print taken from a scene of the crime, and the sample can be a footwear pattern.

In one embodiment of the present invention, the mark-forming object is a car tire, then the mark can be a car tire print taken from a scene of the crime, and the sample can be a car tire pattern.

It is preferable to use an automated information retrieval system with the present method.

Usually, each mark in the array of marks is successively, in advance compared with each sample in the array of samples, indexes of match between the mark and the samples are determined, and the list of high match indexes is formed The object is also achieved by providing a method for forming a database including a register of mark-forming objects in the form of an array of samples and an array of marks, wherein a query sample is entered in the array of samples, compared with a mark of the array of marks, and, as a result of this comparison, an index of match between the query sample and the mark is determined. The mark is compared with each sample of the array of samples and, as a result of this comparison, indexes of match between the mark and said each sample are determined and a list of high match indexes is formed. If an index of match between the query sample and a specific mark is higher than the lowest match index in this list, the index is included into the list.

As the mark is compared with new query prints, the list is amended, while the number of positions in the list remains the same, so that only the highest match indexes eventually remain in the list. Thus, when manually processing the database formed in this way, the efficiency and quality will eventually increase.

Preferably, the indexes in each list of high match indexes are descending.

Preferably, the maximum number of indexes in said list is predetermined.

The object is also achieved by providing a database including a register of mark-forming objects in the form of an array of samples, and an array of marks, wherein, as a result of comparing each mark with samples in the array of samples, a list of high indexes of match between the mark and the samples is formed, the list being associated with this mark, the list including the highest match indexes.

By virtue of the comparison of the mark with each sample, the highest match indexes for this mark are determined. Only if the index of match between the query sample and the mark is higher than the lowest match index from the list of high match indexes, a decision is made that the mark shall be included into the reference list of marks. The reference list thus formed assures the highest probability that a mark belonging to the same mark-forming object as the query sample is detected.

In contrast to known methods for comparing prints with marks, where the number of marks in the reference list is limited compulsively, in the claimed method, the number of marks in the reference list is not limited. However, during trials, the number of marks in the reference list has been found to be acceptable.

Therefore, the present method provides for shortening of the reference list to be manually analyzed by the expert. Moreover, a predetermined reliability of comparison is provided.

Commonly known database processing means can be used with the method of the invention.

DETAILED DESCRIPTION OF THE INVENTION

An embodiment of the present invention used with a dactyloscopic database is described herein. It should be noted that the description of the embodiment is presented as a non-limiting example. On the contrary, those skilled in the art would appreciate that principles of the present invention can be applied for comparing marks and samples of any nature using a corresponding database.

In this embodiment, a database is formed in advance as described below. In a database containing an array of prints and an array of marks, a mark in the array of marks is compared with each print in the array of prints using an automated dactyloscopic information retrieval system. As a result of this comparison, indexes of match between this mark and the prints are determined, a list of high match indexes is formed and stored in the database. The match indexes are descending in the list. The same comparison is made for each mark in the array of marks. As a result, each mark is provided with its individual list of high match indexes. The number of positions in this list is predetermined with consideration for the size of the array and required reliability. For example, 0.8 to 0.9 reliability of a mark-to-print search in the database having 50 million of dactiloscopic cards by means of an automated dactyloscopic information retrieval system using the method of the invention can be provided if the list of high match indexes contains 50 positions.

If a search with regard to a low-quality mark taken from a grievous crime scene is required, the operator can increase the number of positions in the list in order to increase reliability.

Further, it is described how a reference list of marks is formed after entering a new query print in the database, and how the database is further formed. The query print is compared to a mark from the array of marks using an automated dactyloscopic information retrieval system. As a result of the comparison, an index of match between the query print and the mark is determined.

Further steps are taken using the list of high match indexes, associated with this mark, the list being formed during the aforementioned preliminary database formation.

The match index is compared with the lowest match index in the list If the match index is higher than the lowest match index from the list, a decision is made that the mark should be included into the reference list of marks.

Thus, the mark is included into the reference list, if this mark is more similar to the query print than the last print in the list, i.e. having the lowest match index.

A mark designated "n" and having a list of 50 high match indexes shall be included into the reference list for a query print on the condition that the following equation is true:

$I(n)>J(n,m)$, where I is the index of match between the query print and the n-th mark;

J is the index of match between the mark and a print in the list of high indexes of match between the mark and the prints; and m is position number in the list, wherein the indexes are descending.

In this example, m=50.

As further comparisons are made, the list of high match indexes is amended by introducing any index of match between a query print and the mark, which index is higher than the lowest match index in the list.

Thus, lower indexes in the lists associated with marks in the database are replaced by higher indexes as the database is further formed. Therefore, a mark can be included into the reference list only when the probability that the mark matches the query print is high. This increases accuracy of comparison resulting in the most reliable and short reference list.

Match indexes are descending in the list of high match indexes, therefore, during further comparisons, the position of a new match index in the list is indicative of the similarity between the print associated with this index and the mark.

Those skilled in the art would appreciate that other embodiments of the present invention are possible without departing from the spirit and scope of the present invention.

The present invention is most advantageous when searching in a database containing an array of samples obtained under standard conditions, and thus being of relatively high quality, and an array of marks left accidentally, and thus being of relatively low quality.

In particular, the present invention can be applied to various personal identification systems using images obtained from a security camera. In this case, the mark is a video frame from a security camera, and the sample is a photograph or a video frame.

In the police and judiciary practice, the identification of footwear marks or a car tire marks taken from a scene of the crime is crucially important. The present invention can be applied to such types of identification using a database containing an array of footwear marks and/or array of tire track marks, and an array of footwear patterns and/or array of car tire patterns.

Furthermore, the present invention can be applied to firearm identification. In this case, the mark can be a firearm bore track on a bullet taken from a scene of the crime, and the sample can be a firearm bore track from a bullet shot in the forensic laboratory.

We claim:

1. A computer-implemented method for forming a mark reference list using an automated information retrieval system with database including a register of mark-forming objects in the form of a sample array, and a mark array,
    wherein a query sample is compared to a mark of the mark array, and a match index between the query sample and the mark is determined based on said comparison, and the decision is made whether the mark should be included into the mark reference list based on said index,
    characterized in that the mark is compared with each sample of the sample array, match indexes between the mark and said each sample are determined based on said comparison, and a list of high match indexes of the mark and the samples is formed, and the decision is made that the mark should be included into the mark reference list if said match index between the query sample and the mark is higher than the lowest match index from said list of high match indexes of the mark and the samples.

2. The computer-implemented method according to claim 1, characterized in that the mark-forming object is a person.

3. The computer-implemented method according to ,claim 2, characterized in that the mark is a finger mark, and the sample is a fingerprint.

4. The computer-implemented method according to claim 2, characterized in that the mark is a video frame from a security camera, and the sample is a photograph or a video frame.

5. The computer-implemented method according to claim 1, characterized in that the mark-forming object is a firearm.

6. The computer-implemented method according to claim 5, characterized in that the mark is a firearm bore track on a bullet taken from a scene of action, and the sample is a firearm bore track on a bullet shot in laboratory conditions.

7. The computer-implemented method according to claim 1, characterized in that the mark-forming object is footwear.

8. The computer-implemented method according to claim 7, characterized in that the mark is a footwear mark taken from a scene of action, and the sample is a footwear pattern.

9. The computer-implemented method according to claim 1, characterized in that the mark-forming object is a car tire.

10. The computer-implemented method according to claim 9, characterized in that the mark is a car tire mark taken from a scene of action, and the sample is a car tire pattern.

11. The computer-implemented method according to claim 1, characterized in that it utilizes an automated information retrieval system.

12. The computer-implemented method according to claim 1, characterized in that the mark is compared to each sample of the sample array, the match indexes of the mark and the samples are determined, and said list of high match indexes of the mark and the samples is formed in advance, successively for each mark of the mark array.

13. A computer-implemented method for forming a database using an automated information retrieval system including a register of sample-forming objects in the form of sample array, and a mark array,
    wherein a query sample is entered in the sample array of the database and compared with a mark of the mark array, and a match index of the query sample and the mark is determined based on said comparison,
    characterized in that the mark is compared with each sample of the sample array, and match indexes between the mark and the samples are determined based on this comparison, and a list of high match indexes of the mark and the samples is formed, the match index between the query sample and a specific mark being included into said list if said match index is more than the lowest match index of said list of high match indexes of the mark and the samples.

14. The computer-implemented method according to claim 13, characterized in that match indexes in each of said list of high match indexes are sorted in descending order.

15. The computer-implemented method according to claim 13, characterized in that the maximum number of match indexes in said list of high match indexes is predetermined.

16. A database of an automated information retrieval system comprising a register of mark-forming objects in the form of a sample array, and a mark array, wherein a list of high match indexes between each mark and samples is formed for each mark based on the comparison of said each mark with samples of the sample array, said list including the highest match indexes of said each mark and the samples.

* * * * *